(12) United States Patent
Weisser et al.

(10) Patent No.: US 8,471,003 B2
(45) Date of Patent: *Jun. 25, 2013

(54) THERMALLY INHIBITED POLYSACCHARIDES AND PROCESS OF PREPARING

(75) Inventors: Eric Weisser, Somerset, NJ (US); Tushar Shah, Jersey City, NJ (US)

(73) Assignee: Corn Products Development Inc., Westchester, IL (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/729,754

(22) Filed: Mar. 23, 2010

(65) Prior Publication Data

US 2010/0261892 A1    Oct. 14, 2010

Related U.S. Application Data

(60) Provisional application No. 61/169,033, filed on Apr. 14, 2009.

(51) Int. Cl.

| | | |
|---|---|---|
| *C07H 1/00* | (2006.01) | |
| *C07H 3/00* | (2006.01) | |
| *C08B 37/00* | (2006.01) | |
| C08B 31/00 | (2006.01) | |
| C08B 35/00 | (2006.01) | |
| C08B 33/00 | (2006.01) | |

(52) U.S. Cl.
USPC .................................................. 536/124

(58) Field of Classification Search
None
See application file for complete search history.

(56) References Cited

U.S. PATENT DOCUMENTS

| | | | |
|---|---|---|---|
| 5,188,674 | A | 2/1993 | Kasica et al. |
| 5,718,770 | A | 2/1998 | Shah et al. |
| 5,720,822 | A | 2/1998 | Jeffcoat et al. |
| 5,725,676 | A | 3/1998 | Chiu et al. |
| 5,932,017 | A | 8/1999 | Chiu et al. |
| 6,001,408 | A | 12/1999 | Dudacek et al. |
| 6,010,574 | A | 1/2000 | Jeffcoat et al. |
| 6,231,675 | B1 | 5/2001 | Chiu et al. |
| 6,261,376 | B1 | 7/2001 | Jeffcoat et al. |
| 6,277,186 | B1 | 8/2001 | Shi et al. |
| 6,410,075 | B1 | 6/2002 | Dudacek et al. |
| 6,451,121 | B2 | 9/2002 | Chiu et al. |
| 2006/0251792 | A1 | 11/2006 | Shariff et al. |
| 2009/0281304 | A1 | 11/2009 | English et al. |

FOREIGN PATENT DOCUMENTS

| | | |
|---|---|---|
| EP | 1917868 | 5/2008 |
| EP | 1038882 | 10/2008 |
| EP | 2116137 | 11/2009 |
| WO | 95/04082 | 2/1995 |
| WO | 96/04315 | 2/1996 |

OTHER PUBLICATIONS

Hayashi, et al, "High-Pressure Food Processing of Rice and Starch Foods", Rice is life: Scientific Perspectives for the 21st Century, 2004, pp. 278-280.
Igura, et al., "Effect of Moisture Content and Applied Pressure on Flow-Starting Temperature of Starch Melts", Journal of Food Engineering, (1997), 31, 271-276.
Katopo, et al., "Effect and Mechanism of Ultrahigh Hydrostatic Pressure on the Structure and Properties of Starches", Carbohydrate Polymers, (2002), 47, 233-244.
Kawai, et al., "State Diagram of Potato Starch-Water Mixtures Treated with High Hydrostatic Pressure", Carbohydrate Polymers, (2007), 67, 530-535.
Kudla, et al., "The Modification of Starch by High Pressure Part I: Air—and Oven-dried Potato Starch", Starch/Starke, (1992), 44, 167-173.
Kudla, et al., "The Modification of Starch by High Pressure Part II: Compression of Starch with Additives", Starch/Starke, (1992), 44, 253-259.
Martin, Irving, "Crosslinking of Starch by Alkaline Roasting", Journal of Applied Polymer Science, (1967), 11, 1283-1288.
Moreno, et al., High-Pressure Effects on Maillard Reaction between Glucose and Lysine, J. Agric. Food Chem., (2003), 51, 394-400.
Muhr, et al.,"Effect of Hydrostatic Pressure on Starch Gelatinisation", Carbohydrate Polymers (1982), 2, 61-74.
Pukkahuta, et al., Effect of Osmotic Pressure on Starch: New Method of Physical Modification of Starch, Starch/Starke, (2007), 58, 78-90.
Vainionpaa, et al., "High-Pressure Gelatinization of Barley Starch at Low Moisture Levels and Elevated Temperature", Starch/Starke, (1993), 45, 19-24.

*Primary Examiner* — Layla Bland
(74) *Attorney, Agent, or Firm* — Thomas C McKenzie; Karen Kaiser

(57) ABSTRACT

This invention relates to thermally inhibited polysaccharides and improved processes of preparing them, wherein the improvement is dehydrating the polysaccharides under increased pressure and/or increased effective oxygen concentrations to produce compositions of improved organoleptic properties, including color, flavor and odor.

9 Claims, 1 Drawing Sheet

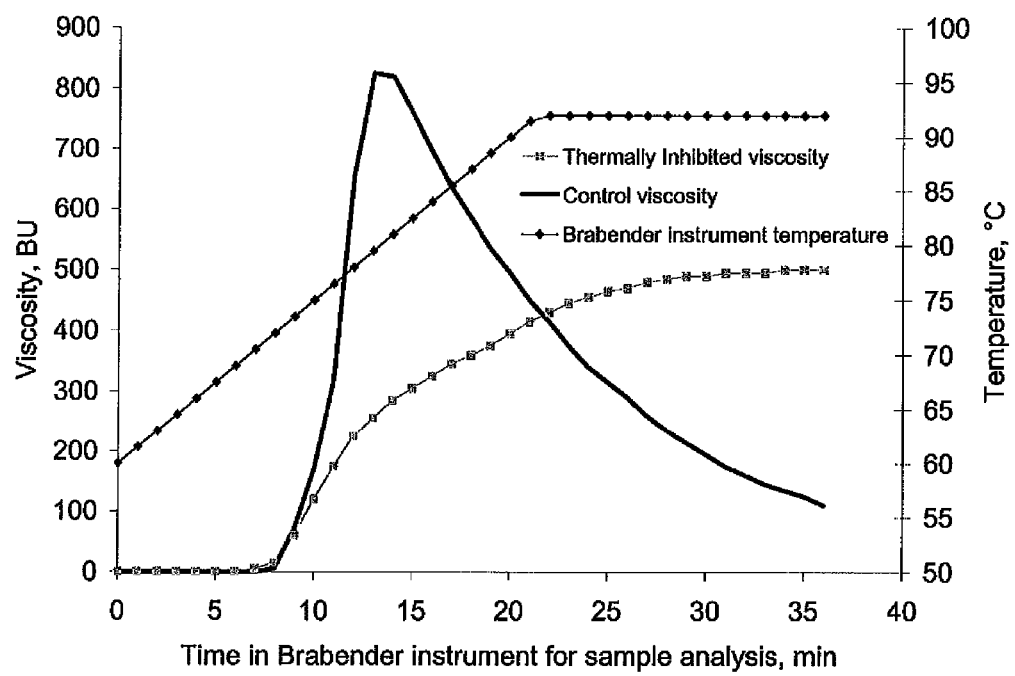
Example Brabender viscosity curve used to determine inhibition. The control viscosity is the Brabender profile for a pH adjusted starch that is not thermally inhibited. The thermally inhibited viscosity curve does not exhibit hydrolysis as the 92°C + 15 minute viscosity is greater than the 92°C viscosity and the 92°C viscosity is greater than 350BU for waxy corn.

THERMALLY INHIBITED POLYSACCHARIDES AND PROCESS OF PREPARING

This application claims priority to provisional patent application Ser. No. 61/169,033 filed 14 Apr. 2009.

BACKGROUND OF THE INVENTION

This invention relates to thermally inhibited polysaccharides and improved processes of preparing them, wherein the improvement is dehydrating the polysaccharides under increased pressure and/or increased effective oxygen concentrations to produce compositions of improved organoleptic properties, including color, flavor and odor.

It is well known that starch can be heated for various purposes such as drying, vaporizing off-flavors, imparting a smoky taste, dextrinizing or annealing. More recently, heat treatment has been used to make thermally inhibited starches. U.S. Pat. No. 5,725,676 issued Mar. 10, 1998 to Chin et al, discloses a process for making thermally inhibited, non-pregelatinized granular starch using heat treatment. U.S. Pat. No. 6,261,376 issued Jul. 17, 2001 to Jeffcoat et al., discloses a thermally inhibited, pregelatinized, non-granular starch or flour prepared by dehydrating and heat treating the starch or flour.

SUMMARY OF THE INVENTION

Now it has been found that significantly improved organoleptic properties, such as color, result from the process of thermally inhibiting polysaccharides by dehydrating the polysaccharide under increased pressure and/or under increased effective oxygen concentrations. In one aspect of this invention, oxygen content of the dehydration vessel atmosphere is increased without increasing the Limiting Oxygen Concentration (12% oxygen), thus providing a possible design option for safe operation.

This invention is directed to a process for making a thermally inhibited polysaccharide which comprises the steps of:
a) dehydrating the polysaccharide to substantially anhydrous or anhydrous conditions under increased pressure and/or under increased effective oxygen concentrations; and
b) thermally inhibiting the substantially anhydrous or anhydrous polysaccharide.

BRIEF DESCRIPTION OF DRAWINGS

FIG. 1 shows a Brabender viscosity curve for a waxy cornstarch example used to determine inhibition. A control curve illustrates the viscosity profile for a native starch not thermally inhibited using the same Brabender procedure.

DETAILED DESCRIPTION OF THE INVENTION

Polysaccharides suitable for use in this invention, and as the term is used herein, include starches, ingredients containing starches, materials derived from starches, gums and materials derived from gums and blends thereof.

Ingredients containing starches include without limitation, flours and grits. Materials derived from starches include without limitation oligosaccharides and other starch derived materials including those prepared by physically, enzymatically or chemically modifying the starch. Such materials are known in the art and may be found in standard texts such as *Modified Starches: Properties and Uses*, Ed. Wurzburg, CRC Press, Inc., Florida (1986).

The starch used in this invention may be any starch derived from any native source. A native starch as used herein, is one as it is found in nature. Also suitable are starches derived from a plant obtained by standard breeding techniques including crossbreeding, translocation, inversion, transformation, insertion, irradiation, chemical or other induced mutation, or any other method of gene or chromosome engineering to include variations thereof. In addition, starch derived from a plant grown from induced mutations and variations of the above generic composition which may be produced by known standard methods of mutation breeding are also suitable herein.

Typical sources for the starches are cereals, tubers and roots, legumes and fruits. The native source can be any variety, including without limitation, corn, potato, sweet potato, barley, wheat, rice, sago, amaranth, tapioca (cassava), arrowroot, canna, pea, banana, oat, rye, triticale, and sorghum, as well as low amylose (waxy) and high amylose varieties thereof. Low amylose or waxy varieties is intended to mean a starch containing less than 10% amylose by weight, in one embodiment less than 5%, in another embodiment less than 2% and in yet another embodiment less than 1% amylose by weight of the starch. High amylose varieties is intended to mean a starch which contains at least about 30% amylose, in a second embodiment at least 50% amylose, in a third embodiment at least about 70% amylose, in a fourth embodiment at least about 80% amylose, and in a fifth embodiment at least about 90% amylose, all by weight of the starch.

The polysaccharide may be physically treated by any method known in the art to mechanically alter the polysaccharide, such as by shearing or by changing the granular or crystalline nature of the polysaccharide, and as used herein is intended to include conversion and pregelatinization. Methods of physical treatment known in the art include ball-milling, homogenization, high shear blending, high shear cooking such as jet cooking or in a homogenizer, drum drying, spray-drying, spray cooking, chilsonation, roll-milling and extrusion.

The polysaccharide may be chemically modified by treatment with any reagent or combination of reagents known in the art. Chemical modifications are intended to include crosslinking, acetylation, organic esterification, organic etherification, hydroxyalkylation (including hydroxypropylation and hydroxyalkylation), phosphorylation, inorganic esterification, ionic (cationic, anionic, nonionic, and zwitterionic) modification, succination and substituted succination of polysaccharides. Also included are oxidation and bleaching. Such modifications are known in the art, for example in *Modified starches: Properties and Uses*. Ed. Wurzburg, CRC Press, Inc., Florida (1986).

The starch may be granular or pregelatinized, either before or after the thermal inhibition. Pregelatinized starches, also known as cold water soluble or dispersed starches, are well known in the art as are the methods of preparing them by thermal, chemical or mechanical gelatinization and then drying. The term "gelatinized" starch refers to swollen starch granules which have lost their polarization (Maltese) crosses and which may, or may not, have lost their granular structure. The thermal processes used to gelatinize starches include batch cooking, autoclaving, and continuous cooking processes in equipment which includes, without limitation, a heat exchanger, jet-cooker, spray drier, and drum drier.

Gums that may be used are well known in the art and include xanthan, carrageenan, gellan, locust bean, alginate, pectin, agar, gum arabic, and guar gum. Materials derived from gums include those listed which have been further modified using methods known in the art such as hydrolysis and chemical modification.

Starch and flour are particularly useful polysaccharides. In one suitable embodiment, the starch base is a native starch, in another embodiment is a native waxy starch, and in yet another embodiment a high amylose starch.

The polysaccharide may be a single polysaccharide or a blend of two or more polysaccharides. The polysaccharides also may be dehydrated and/or thermally inhibited in the presence of other materials or ingredients which would not interfere with the thermal inhibition process nor substantially hydrolyze the polysaccharide.

The thermal inhibition process may be carried out prior to or after the polysaccharide is further modified. In one embodiment, the modification is conducted before the polysaccharide is thermally inhibited. In another embodiment, the polysaccharide is not further modified, before or after thermal inhibition.

The polysaccharide may be adjusted before, after, and/or during the dehydration step, if necessary, to a pH level effective to maintain the pH at neutral (range of pH values around 7, from about pH of 6 to 8) or basic pH (alkali) during the subsequent thermal inhibition step. Such adjustment is known in the art, including methods of pH adjustment, types of buffers and alkalis used, and pH levels suitable.

The polysaccharide is dehydrated to anhydrous or substantially anhydrous conditions. As used herein, the term "substantially anhydrous" is intended to mean less than 5%, in one embodiment less than 2% and in yet another embodiment less than 1% (w/w) water. The dehydration step to remove moisture and obtain a substantially anhydrous polysaccharide is carried out under increased pressure and/or under increased effective oxygen concentration. Such dehydration may be accomplished by any means known in the art and includes thermal methods, and non-thermal methods. Non-thermal methods would include using a hydrophilic solvent such as an alcohol (e.g. ethanol), freeze drying, or using a desiccant. Non-thermal dehydration may contribute to improvement of the taste of the thermally-inhibited polysaccharides.

Thermal methods of dehydration are also known in the art and are accomplished using a heating device for a time and elevated temperature sufficient to reduce the moisture content to that desired. In one embodiment, the temperature used is 125° C. or less. In another embodiment, the temperature will range from 100 to 140° C. While the dehydration temperature can be lower than 100° C., a temperature of at least 100° C. will be more effective in removing moisture when using a thermal method.

If the dehydration is conducted at elevated pressures, it is suitably conducted in a pressurized reactor. In one embodiment, the pressure is from standard atmospheric pressure to 525 kPag, while in another embodiment the pressure is from 145 to 515 kPag. The gas used at elevated pressures may be an inert gas such as nitrogen or carbon dioxide, or may be an oxygen-containing gas such as air, enriched air, or an air-like mixture with reduced oxygen content such as a nitrogen/oxygen mixture. In one embodiment, the gas is an inert gas. In another embodiment, the gas has an oxygen content of less than 12% by weight (the Limiting Oxygen Concentration) and in yet a further embodiment, the oxygen content of the gas is in the range of 8-12% by weight. In one method, the gas used is pre-dried to remove any moisture.

The technique of using increased pressure at elevated temperature can be used in any equipment that can heat material with a controlled temperature profile. The vessel or container used as equipment must be rated for pressure, i.e. structurally sound to contain the vessel pressure, and in another embodiment able to contain or safely vent the propagation of a combustion-deflagration wave caused by a dust explosion at elevated temperature/pressures if the vessel atmosphere exceeds the Limiting Oxygen Concentration when using higher oxygen concentrations.

In another embodiment, the dehydration is conducted in an increased effective oxygen concentrations of at least 6.5 moles/m$^3$. This may be accomplished by increasing the pressure above atmospheric pressure (as detailed above) and/or by increasing the percent oxygen in the surrounding gas used to above 21% by volume, and in one aspect of the invention between 21% and 35% oxygen by volume of the gas. In another aspect of the invention, the dehydration is conduct in an increased effective oxygen concentration of at least at least 9 moles/m$^3$, in another to at least 12 moles/m$^3$, and in yet another to at least 25 moles/m$^3$. Increased oxygen concentration may be used over a wide range with equipment effectiveness and safety considerations being limiting factors. Increased oxygen concentration may be achieved by any method known in the art. In one embodiment, increased oxygen concentration is achieved by using enriched oxygen gas (greater than the about 21% oxygen content of air). This embodiment may be at ambient pressure or at higher pressure, as long as safety is maintained, and in one embodiment is at ambient pressure. In another embodiment, increased oxygen concentration is achieved by increasing the pressure of the gas above ambient within the apparatus during thermal inhibition, this embodiment has the advantage that the Limiting Oxygen Concentration (below which combustion of cornstarch is prevented) does not change with the pressure of the gas. In another embodiment, the combination of increased oxygen, either above the Limiting Oxygen Content and/or enriched oxygen content and pressure will provide the greatest improvement in decreasing the color (increasing the Hunter L-value) of the product during dehydration.

The dehydration step may be conducted using any process or combination of processes which allows moisture to be removed and may be conducted under increased pressure and/or effective oxygen concentration. In one embodiment, dehydration is conducted in a thin film of less than one inch, and in another less than half an inch.

The dehydration step is typically conducted in an apparatus fitted with a means for moisture removal (e.g. a blower to sweep gas from the head-space of the apparatus, fluidizing gas) to substantially prevent moisture from accumulating and/or precipitating onto the polysaccharide. The dehydrating and thermal inhibition apparatus (singular or plural) can be any thermally controlled vessel and includes without limitation industrial ovens, such as conventional or microwave ovens, dextrinizers, fluidized bed reactors and driers, and mixers or blenders. As used herein, a fluidized (bed) reactor, fluidized (bed) drier or fluidized (bed) mixer is intended to mean any apparatus in which the polysaccharide is substantially fluidized, whether by gas, mechanical or other means. Typical equipment for dehydrating starches are known in the art and are disclosed in U.S. Pat. No. 5,932,017 issued to Chiu et at on Aug. 3, 1999 and U.S. Pat. No. 6,261,376 issued to Jeffcoat et al on Jul. 17, 2001.

The time and temperature combination for the dehydration will depend upon the equipment used and may also be affected by the type of polysaccharide being treated, the pH and moisture content, and other factors identified and selected by the practitioner.

The thermal inhibition step is performed using methods known in the art and are disclosed, for example, in U.S. Pat. Nos. 5,932,017 and 6,261,376 and U.S. Ser. No. 61/051,057.

When polysaccharides are subjected to heat in the presence of water, hydrolysis or degradation may occur. Hydrolysis or degradation will reduce the viscosity. Therefore, the conditions for the dehydration need to be chosen so that inhibition is favored while reducing hydrolysis and degradation. In one aspect of the invention, the polysaccharide is substantially anhydrous before reaching heat treatment temperatures, and in another aspect of the invention the polysaccharide is substantially anhydrous throughout at least ninety percent of the heat treatment.

By varying the process conditions, including the initial pH, the dehydrating method and conditions, and the thermal inhibition temperatures, times and conditions, the level of inhibition can be varied to provide different viscosity characteristics in the final thermally inhibited polysaccharide.

Following the thermal inhibition step, the polysaccharide may be further processed by one or more of the following: screened to select a desirable particle size, slurried and washed, filtered and/or dried, bleached or otherwise refined, and/or pH adjusted. The polysaccharide may further be blended with other unmodified or modified polysaccharide or with food ingredients before use in an end use product.

The resultant polysaccharides are functionally similar to thermally inhibited polysaccharides in which the dehydration step is not conducted under increased pressure and/or with increased effective oxygen concentration. However, the resultant thermally inhibited polysaccharides have improved color, flavor and odor relative to such thermally inhibited polysaccharides.

In one embodiment, the Hunter color of the thermally inhibited polysaccharide decreases by less than 7, in another embodiment by less than 5, and in still another embodiment by less than 3, Hunter L units compared to the polysaccharide before processing, using the method described in the examples section. In one embodiment, the Hunter L color is at least 0.5 units, in another at least 1 unit, in yet another at least 2 units, and in still yet another at least 3 units, higher than a polysaccharide which is processed in the same fashion except that dehydration is not under increased pressure and/or increased effective oxygen concentration.

The resultant thermally inhibited polysaccharide may be used in place of chemically modified or crosslinked polysaccharides presently used in foods, yet maintain a clean label (non-modified label). Among the food products that may be improved by the use of the polysaccharides of this invention are baby foods, liquid infant formulations, sauces and gravies, soups, salad dressings and mayonnaise and other condiments, yoghurt, sour cream and other dairy products, pudding and pie fillings, fruit preparations, liquid diet products and liquid products for hospital feeding, baked goods such as breads, cakes and cookies, and ready-to-eat cereals. The polysaccharides are also useful in dry mixes for sauces, puddings, baby foods, hot cereals, nutritional products, and the like. The thermally inhibited polysaccharides are suitable for use in food applications where viscosity stability is required through all processing temperatures. The resultant polysaccharide may be used in any amount desired and is typically used at substantially the same concentration as a chemically modified polysaccharide which imparts similar viscosity and textural attributes. In one embodiment, the polysaccharide is used in an amount of 0.1 to 35% and in another of 2 to 6%, by weight of the food product.

The thermally inhibited polysaccharides may also be used in place of chemically modified or crosslinked polysaccharides presently used in other applications in which such polysaccharides are currently used, including without limitation in the manufacture of paper, packaging, adhesives, pharmaceutical and personal care products.

EXAMPLES

The following examples are presented to further illustrate and explain the present invention and should not be taken as limiting in any regard. All parts and percentages are given by weight, except for gases which are given in volume, and all temperatures in degrees Celsius (° C.) unless otherwise noted.

The following procedures were used throughout the examples.

Brabender Viscosity Procedure—The polysaccharide to be tested was slurried in a sufficient amount of distilled water to give 5% anhydrous solids slurry at pH 3—adjusted with a sodium citrate/citric acid buffer. Charge weight is 23.0 grams anhydrous polysaccharide, 387 grams distilled water, and 50 grams buffer solution. Buffer solution is prepared by mixing 1.5 volumes of 210.2 grams citric acid monohydrated diluted to 1000 ml with distilled water with 1.0 volumes of 98.0 grams tri-sodium citrate, dihydrate diluted to 1000 ml with distilled water. The slurry was then introduced to the sample cup of a Brabender VISCO\Amylo\GRAPH (manufactured by C. W. Brabender Instruments, Inc., Hackensack, N.J.) fitted with a 350 cm/gram cartridge and the viscosity was measured as the slurry was heated (at a rate of 1.5° C./minute) to 92° C. and held for fifteen minutes (15'). The viscosity was recorded at 92° C. and again after the fifteen minute hold at 92° C. (92° C.+15). Time relative to the Brabender procedure is zeroed when the charge is brought to 60° C.

The VISCO\Amylo\GRAPH records the torque required to balance the viscosity that develops when a polysaccharide slurry is subjected to a programmed heating cycle.

Using this procedure, substantial hydrolysis for waxy maize corn starch may be indicated by a 92° C.+15 minute viscosity less than the 92° C. viscosity with a 92° C. viscosity less than 500 BU. One skilled in the art realizes that it is difficult to separate hydrolysis from thermal inhibition by viscosity alone. For example, either high levels of thermal inhibition or high levels of hydrolysis may result in low viscosity. It is known that a more thorough analysis is required to measure the extent of hydrolysis either through texture, where hydrolysis will produce longer and more cohesive textures, or through a measurement of the granular starch solubility where an increase in solubility after dispersion or cooking is indicative of hydrolysis.

Moisture Procedure—Five grams of powder is weighed onto a Cenco B-3 Digital moisture balance. The bulb power is set to 100% to heat the sample to between 135-140° C. for 15 minutes. Weight percent moisture is determined by weight loss and reported directly by the moisture balance.

Hunter Colorimeter Procedure—The Hunter Color Quest II is warmed up for an hour prior to performing standardization or analyzing samples. Standardization is performed using the procedure provided by the manufacturer. Sample readings are taken using the following settings: Scale=Hunter Lab, Illuminant=D65, Procedure=NONE, Observer=10*, MI Illuminant=Fcw, Difference=DE, Indices=YID 1925 (2/C), Display Mode=Absolute, Orientation=Row Major. All color analysis reported here is performed on powder samples. Powder is loaded into the sample cell and the cell is tapped to eliminate gaps between the cell window and the powder. The sample cell is loaded into the colorimeter and the sample read.

Example 1

Effect of Oxygen Concentration in a Fluidized Bed Reactor

Waxy maize starch adjusted to a pH of 9.5 with a combination of hydroxide and carbonate (Hunter L color=94.87) is dehydrated in a pressurized fluid bed reactor under varying oxygen concentration levels—all below the Limiting Oxygen Concentration. In the first experiment, the starch is dehydrated at 132° C. and at 345 kPag. In a second experiment, the pH adjusted waxy starch is dehydrated, at 132° C. and 517 kPag to less than 1% moisture in a fluid bed reactor, while in a third experiment, the pH adjusted waxy starch is dehydrated at 132° C. and ambient pressure, to less than 1% moisture in a fluid bed reactor. After reaching substantially anhydrous conditions the pressure is relieved and the contents cooled. The resultant starch is removed and the color measured. As the pressure is increased during the dehydration the color change as measured by the initial Hunter L value minus the final Hunter L value is reduced.

The second phase of the experiment involved taking each of the three substantially anhydrous samples and spilling into two further samples. One series of samples was reintroduced to a fluidized bed reactor, heated to 166° C. and held for an appropriate time to reach a given viscosity or inhibition level. After analysis, the samples that was dehydrated under pressure had a higher Hunter L color indicating that they were whiter than those dried under atmospheric conditions, with increased pressure during dehydration leading to higher Hunter L colors after Thermal Inhibition.

The second series of samples was reintroduced to a Littleford reactor, heated to 166° C. and held for an appropriate time to reach a given viscosity or inhibition level. After analysis, the samples that was dehydrated under pressure had a higher Hunter L color indicating that they were whiter than those dried under atmospheric conditions, with increased pressure during dehydration leading to higher Hunter L colors after thermal inhibition.

We claim:

1. A process which comprises the steps of:
   a) dehydrating a polysaccharide in the presence of a gas to substantially anhydrous or anhydrous conditions under an increased effective oxygen concentration of at least 6.5 moles/m$^3$;
   b) relieving the pressure; and
   c) thermally inhibiting the substantially anhydrous or anhydrous polysaccharide at atmospheric pressure, wherein
   the dehydration step is conducted above atmospheric pressure.

2. The process of claim 1, wherein the effective oxygen concentration is at least 9 moles/m$^3$.

3. The process of claim 1, wherein the effective oxygen concentration is at least 12 moles/m$^3$.

4. The process of claim 1, wherein the effective oxygen concentration is at least 25 moles/m$^3$.

5. The process of claim 1, wherein the pressure is from 145 to 515kPag.

6. The process of claim 1, wherein the gas contains less than 12% oxygen by volume of the gas.

7. The process of claim 1, wherein the gas contains between 8% and 12% oxygen by volume of the gas.

8. The process of claim 1, wherein the polysaccharide is selected from the group consisting of a starch, a gum and a flour.

9. The process of claim 8, wherein the starch is a waxy starch.

\* \* \* \* \*